(12) United States Patent
Cheng et al.

(10) Patent No.: US 9,554,335 B2
(45) Date of Patent: Jan. 24, 2017

(54) METHOD AND SYSTEM FOR SELF-OPTIMIZED UPLINK POWER CONTROL

(71) Applicant: Huawei Technologies Co., Ltd., Shenzhen (CN)

(72) Inventors: Ho Ting Cheng, Stittsville (CA); Hang Zhang, Nepean (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/185,877

(22) Filed: Jun. 17, 2016

(65) Prior Publication Data

US 2016/0295518 A1  Oct. 6, 2016

Related U.S. Application Data

(62) Division of application No. 13/586,464, filed on Aug. 15, 2012, now Pat. No. 9,398,540.

(51) Int. Cl.
| | | |
|---|---|---|
| *H04N 7/00* | (2011.01) | |
| *H04W 52/06* | (2009.01) | |
| *H04W 52/14* | (2009.01) | |
| *H04W 52/24* | (2009.01) | |
| *H04W 52/22* | (2009.01) | |
| *H04W 52/40* | (2009.01) | |

(52) U.S. Cl.
CPC .......... *H04W 52/06* (2013.01); *H04W 52/146* (2013.01); *H04W 52/243* (2013.01); *H04W 52/225* (2013.01); *H04W 52/40* (2013.01)

(58) Field of Classification Search
CPC ..................................................... H04W 52/06
USPC ................... 455/41.1, 425, 522; 340/310.15
See application file for complete search history.

(56) References Cited

U.S. PATENT DOCUMENTS

| | | | |
|---|---|---|---|
| 5,991,618 A | 11/1999 | Hall | |
| 6,141,565 A * | 10/2000 | Feuerstein | H04W 16/06 |
| | | | 455/422.1 |
| 2005/0190855 A1* | 9/2005 | Jin | H04W 52/225 |
| | | | 375/296 |
| 2007/0197254 A1* | 8/2007 | Borran | H04W 52/146 |
| | | | 455/522 |
| 2007/0210899 A1 | 9/2007 | Kato et al. | |
| 2011/0045865 A1* | 2/2011 | Viering | H04W 52/325 |
| | | | 455/522 |

* cited by examiner

*Primary Examiner* — Hsin-Chun Liao
(74) *Attorney, Agent, or Firm* — Slater Matsil, LLP

(57) ABSTRACT

A method for optimizing uplink power control settings in a wireless network, the method comprising generating a first gene pool comprising a set of parent genes, wherein each parent gene comprises a set of first generation power control solutions for a set of base stations in the wireless network. The method may further include performing natural selection on the first gene pool to generate a second gene pool comprising selected ones of the set of parent genes, wherein the selected parent genes are chosen by probabilistically selecting some of the parent genes based on fitness values assigned to the parent genes. The method may further include evolving the second gene pool into a descendent gene, wherein the descendent gene comprises a set of local power control solutions for the set of base station in the wireless network.

20 Claims, 11 Drawing Sheets

METHOD AND SYSTEM FOR SELF-OPTIMIZED UPLINK POWER CONTROL

This Application is a divisional application of U.S. Non-Provisional application Ser. No. 13/586,464, filed on Aug. 15, 2012 and entitled "Method and System for Self-Optimized Uplink Power Control," which is hereby incorporated by reference herein as if reproduced in its entirety.

TECHNICAL FIELD

The present invention relates generally to optimizing uplink power control in wireless communication systems.

BACKGROUND

Uplink power control (PC) is an important consideration in modern day cellular communication systems that rely on code division multiple access (CDMA) schemes, Orthogonal Frequency-Division Multiple Access (OFDMA) schemes, single carrier frequency division multiple access (SC-FDMA) schemes, etc. to manage uplink communications. Uplink PC may, for instance, control uplink transmissions in the Physical Uplink Shared Channel (PUSCH) of a long term evolution (LTE) wireless network. Specifically, uplink transmissions may undergo varying degrees of signal attenuation (e.g., path loss, etc.) as they travel through the PUSCH, and consequently may have a decreased power level upon reception. The power level of the uplink signals at reception may directly affect throughput such that uplink signals with higher power levels at reception are able to carry data at a higher bit rate. Hence, one way to increase the throughput of an individual uplink signal may be to transmit the uplink signal at a higher power level. However, increasing the transmission power of one uplink signal may also increase the degree to which that uplink signal interferes with other uplink signals in the PUSCH, thereby reducing the data throughput of those uplink signals accordingly. One way to address this problem is to develop an uplink PC solution that governs the PC settings for each of the user equipments (UEs) in a coverage region. Effective uplink PC solutions should improve network throughput while providing adequate coverage at the cell-edge.

An uplink PC solution may comprise a set of PC settings that control user equipment (UE) uplink transmissions to prevent substantial interference in the uplink channel. An optimal uplink PC solution may reduce network interference while achieving satisfactory data-throughput for all UEs in a base station's (BS's) coverage area, thereby maximizing throughput while maintaining desired network coverage. Uplink PC solutions may be computed locally at the BS level (referred to herein as the "gradient search approach") or globally at the network level (referred to herein as the "exhaustive search approach"). The uplink PC solutions may be based on various PC computation schemes, including fractional power control, interference based power control, cell interference based power control, etc. While much of the discussion herein is in the context of a fractional power control scheme, the concepts are equally applicable to other power control schemes.

In wireless systems that manage uplink PC via the gradient search approach, each BS may unilaterally compute its own uplink PC solution based on its own measured PC parameters (i.e., irrespective of the PC solutions of other BSs). While the gradient search approach may efficiently compute locally optimal PC solutions, it may fail to achieve a globally optimal set of local PC solutions for the wireless network because it may fail to account for the effect each local PC solution will have on neighboring BSs. Specifically, changing a PC setting for a UE in one coverage area may affect the interference realization of a neighboring base station.

In wireless systems that manage uplink PC via the exhaustive search approach, a centralized PC controller may compute a globally optimized set of uplink PC solutions based on an exhaustive search of all possible uplink PC solutions for a cluster of proximately located base stations. Specifically, the globally optimized set of uplink PC solutions may be computed based at least in part on PC parameters reported by the cluster of BSs. While the exhaustive search approach may effectively compute a globally optimized set of PC solutions, the complex nature of the computation may consume large amounts of network resources (e.g., processing capacity, time, etc.). As such, a less computationally complex approach for finding a globally optimal set of uplink PC solutions is desired.

SUMMARY OF THE INVENTION

Technical advantages are generally achieved, by preferred embodiments of the present invention which describe system and methods for optimizing uplink power control.

In accordance with an embodiment, a method for optimizing uplink power control settings in a wireless network, the method comprising receiving a plurality of power control parameter logs from a plurality of base stations in the wireless network. The method may further comprise generating a set of parent genes, wherein each parent gene comprises a set of first generation power control solutions, and wherein each set of first generation power control solutions includes a local power control solution for each base station. The method may further comprise evolving the set of parent genes into a set of descendent genes, wherein each descendent gene comprises a set of evolved power control solutions, and wherein each set of evolved power control solutions includes an evolved local power control solution for each base station. The method may further comprise evaluating a fitness of each descendent gene. The method may further comprise identifying a fittest descendent gene out of the set of descendent genes, wherein the fittest gene comprises an optimized global power control solution. The method may further comprise broadcasting the optimized global power control solution to the plurality of base stations.

In accordance with another embodiment, an apparatus for optimizing uplink power control in a wireless network, the apparatus comprising a processor and a computer readable storage medium storing programming for execution by the processor. The programming may include instructions to receive a set of power control parameters from a set of base stations in the wireless network. The programming may further include probabilistically determining an optimized global power control solution for the wireless network, wherein the optimized global power control solution comprises a set of local power control solutions that are computed by iteratively performing a power control optimization algorithm based at least in part on the set of power control parameters, and wherein the optimized global power control solution is determined without performing an exhaustive search of substantially all possible power control solutions for the wireless network. The programming may further include sending the optimized global power control solution to the set of base stations in the wireless network.

In accordance with yet another embodiment, a method for optimizing uplink power control settings in a wireless network, the method comprising generating a first gene pool comprising a set of parent genes, wherein each parent gene comprises a set of first generation power control solutions for a set of base stations in the wireless network. The method may further include performing natural selection on the first gene pool to generate a second gene pool comprising selected ones of the set of parent genes, wherein the selected parent genes are chosen by probabilistically selecting some of the parent genes based on fitness values assigned to the parent genes. The method may further include evolving the second gene pool into a descendent gene, wherein the descendent gene comprises a set of local power control solutions for the set of base station in the wireless network.

As used herein, the terms "evolve", "evolving" and "evolution" pertain to a process by which a new variant (or generation) of a gene (e.g., a descendent or child gene) is obtained through transformation of one or more ancestor or parent genes. In embodiments, evolution may include performing one or more transformative processes in accordance with the fitness of one or more current generation genes. These transformative processes may include, but are not limited to, selection, crossover, and modification (also referred to as "mutation"), for which: (a) Selection provides for probabilistic selection of genes in accordance with such considerations as fitness, as indicated by a fitness value; (b) Crossover provides for generation of a new gene by combining a portion of criteria such as power control settings from one gene, and combining such criteria with a similar or identical criteria from a different gene; and (c) Mutation provides for a change in criteria (such as some or all of the gene's power control settings). Evolution may include transformative process other than those expressly discussed herein.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

Figure 1:
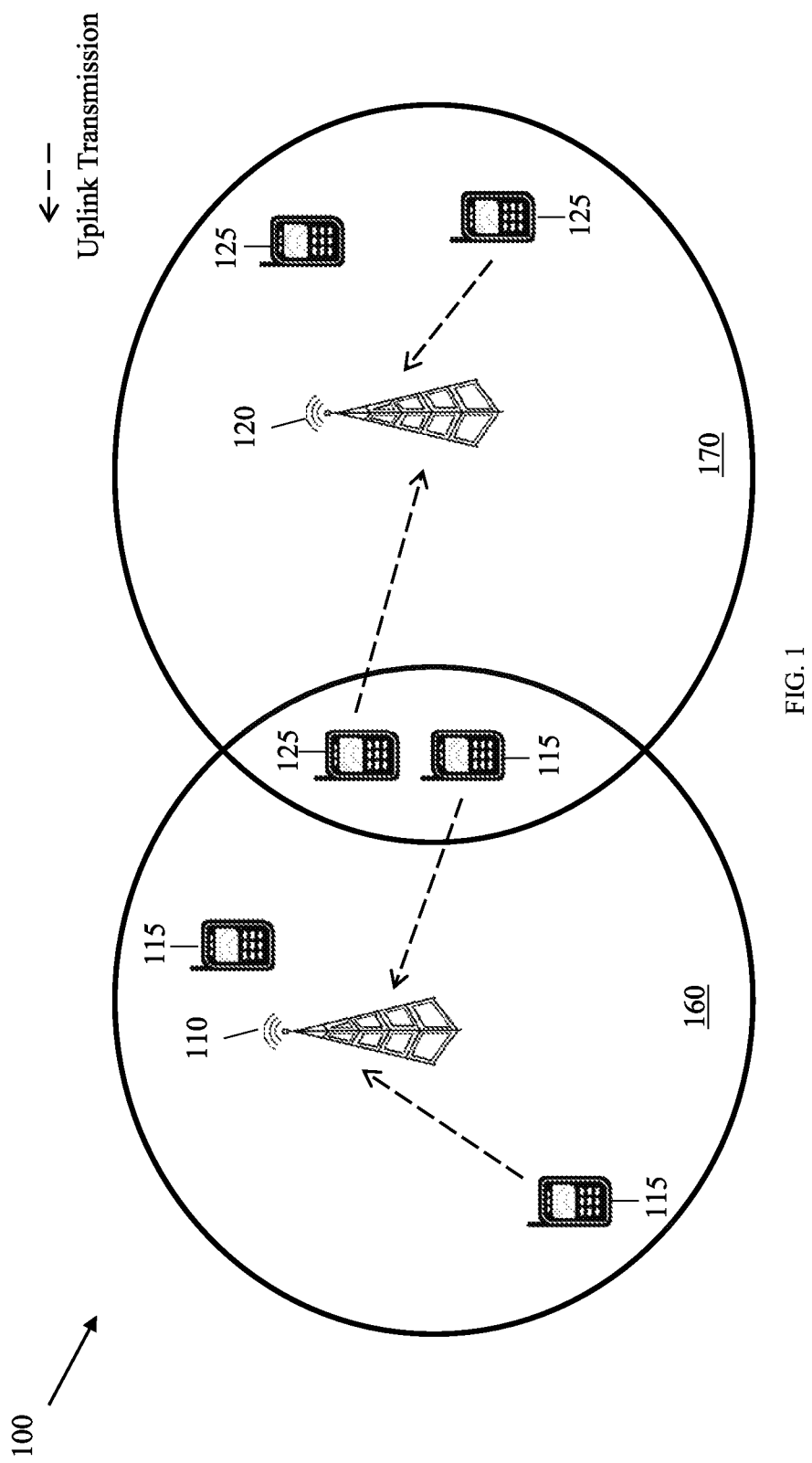
FIG. 1 illustrates a wireless network architecture.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

For purposes of clarity and concision, uplink PC solutions will be referred to herein simply as "PC solutions". As used herein, the term "local PC solution" may refer to a set of PC settings computed for the UEs of a single BS, while the term "global PC solution" may refer to a set of local PC solutions computed for a set of BSs in a wireless network. A "set of locally optimized PC solutions" may refer to a set of local PC solutions that have been computed unilaterally (i.e., irrespective of one another's PC settings), while the term "optimum global PC solution" may refer to about the best set of local PC solutions for achieving a desired uplink performance level (e.g., coverage, throughput, etc.) in a wireless network (or cluster of BSs). For instance, the gradient approach may generate a set of locally optimized PC solutions, while the exhaustive search approach may generate an optimum global PC solution.

As referred to herein, the term "optimized global PC solution" may refer to a set of PC solutions that achieve acceptable performance levels for a wireless network as defined by an administrator or wireless service provider. Importantly, the term optimized may be used loosely herein, and may not necessarily infer that a referenced PC solution is equivalent to the optimum global PC solution. The term "PC optimization algorithm" may refer to an algorithm for computing an "optimized global PC solution." Importantly, the term optimization may be used loosely herein, and may not necessarily infer that a referenced algorithm will generate the optimum global PC solution. For instance, an optimized global PC solution may not necessarily include the best possible set of local PC solutions as would be achieved by an exhaustive search. Instead, an optimized global PC solution may infer that the referenced PC solution includes a satisfactory set of local PC solutions that have been globally optimized (to some extent) using one or more of the non-exhaustive techniques discussed below. Depending on the degree of optimization, an optimized global PC solution may perform almost as well (or equally as well) as the optimum global PC solution, while being generated through less computationally complex techniques (e.g., in comparison to an exhaustive search approach). In some embodiments, the difference in performance between an optimized global PC solution and the optimal global PC solution may be either negligible or outweighed by advantages in computational efficiency.

As discussed below, PC solutions may be computed based upon, inter alia, PC parameters. As used herein, the term "PC parameters" may encompass "PC settings", "PC parameter statistics", or both. The term "PC parameter statistics" may refer to any quantifiable metric (e.g., interference over thermal (IoT), path loss (PL), channel gain, etc.) that describes a quality or characteristic of an uplink signal transmission, while the term "PC setting" may refer any setting (e.g., power, frequency, etc.) used to control uplink signal transmissions. PC parameter statistics may be affected by a variety of dynamic factors, including the PC settings used to generate the uplink signal, and other factors such as shadowing, path loss, multipath fading, etc.

FIG. 1 illustrates a wireless network 100 comprising a first BS 110, a first plurality of UEs 115, a second BS 120, and a second plurality of UEs 125. The BS 110 may serve the UEs 115, and the BS 120 may serve the UEs 125. The BS 110 may have a coverage area 160, and the BS 120 may have a coverage area 170. In some embodiments, the coverage areas 160 and 170 may overlap, and one or more of the UEs 115 or the UEs 125 may be located within the overlap region.

Uplink transmissions (dashed arrows) from the UEs 115 and 125 may experience interference in the network 100. For instance, uplink transmissions from the UEs 115 may interfere with one another, as well as with uplink transmissions from the UEs 125. In some instances, higher uplink power levels may produce more interference, and hence uplink transmissions may interfere with one another to a greater degree as uplink power is increased. As such, PC solutions implemented by the BS 110 may affect the signal quality of uplink transmissions received by the BS 120, and vice-versa. Consequently, it may be beneficial to cluster the BSs 110 and 120, as well as other nearby BSs (not shown), when computing PC solutions.

Figure 2:
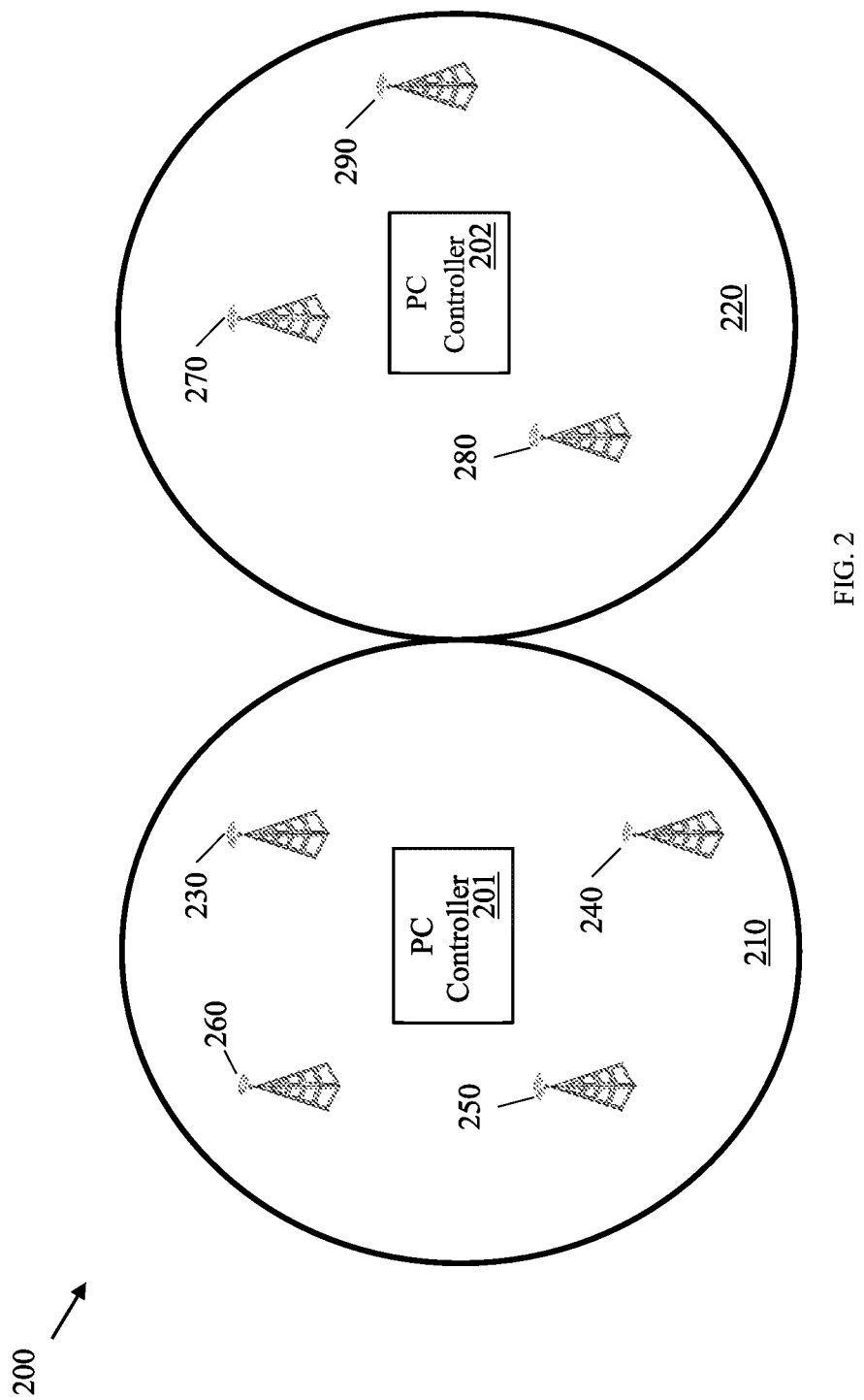
FIG. 2 illustrates a wireless network architecture comprising PC controllers.

FIG. 2 illustrates a wireless network 200 comprising a PC controller 201, a PC controller 202, and a plurality of BSs 230-290. The PC controllers 201-202 may be any device capable of computing PC solutions for the wireless network 200 based on PC parameters provided by the BSs 230-290 and/or other configuration data. The BSs 230-290 may be configured similar to the BSs 110 and 120, and may serve a plurality of UEs, which are not depicted in FIG. 2 for purposes of clarity and concision. The PC controller 201 may perform PC computations for BSs located in the proximity area 210, while the PC controller 202 may perform PC computations for BSs located in the proximity area 220. Hence, the PC controller 201 may serve the BSs 230-260, while the PC controller 202 may serve the BSs 270-290.

Figure 3:
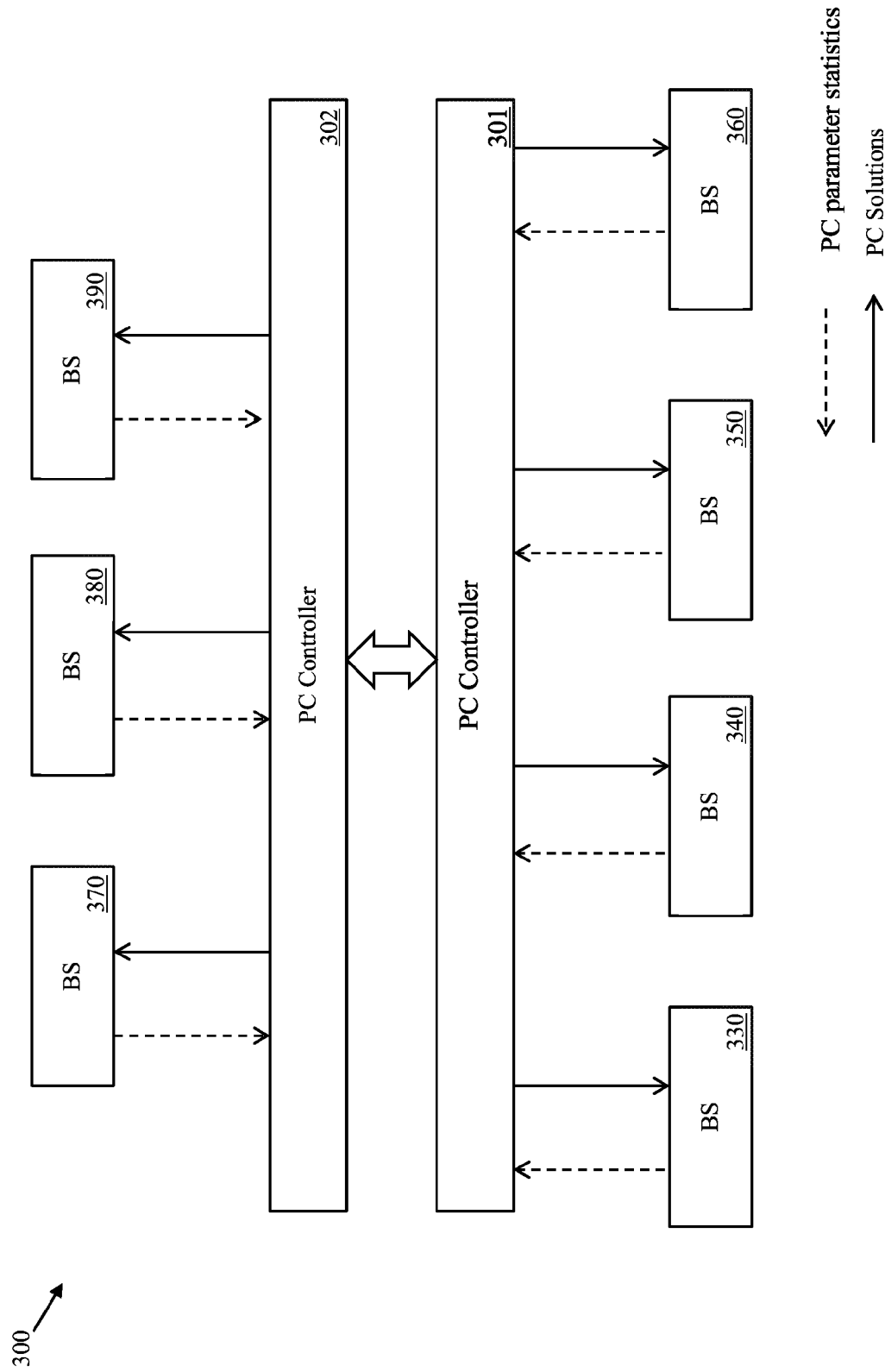
FIG. 3 illustrates a diagram of an embodiment of a communication protocol for implementing uplink PC optimization in a wireless communication network.

FIG. 3 illustrates a communication protocol 300 for PC computation between a pair of PC controllers 301-302 and a plurality of BSs 330-390. The PC controllers 301-302 may be configured similarly to the PC controllers 201-202, and the BSs 330-390 may be configured similarly to the BSs 230-290. As shown, the BSs 330-390 may communicate PC parameters (dashed arrow) to the PC controllers 301-302, after which the PC controllers 301-302 may subsequently communicate PC solutions (solid arrows) to the BSs 330-390. Additionally, the PC controllers 301-302 may communicate PC parameters, PC solutions, and/or other configuration data with one another (double arrowhead).

Figure 4:
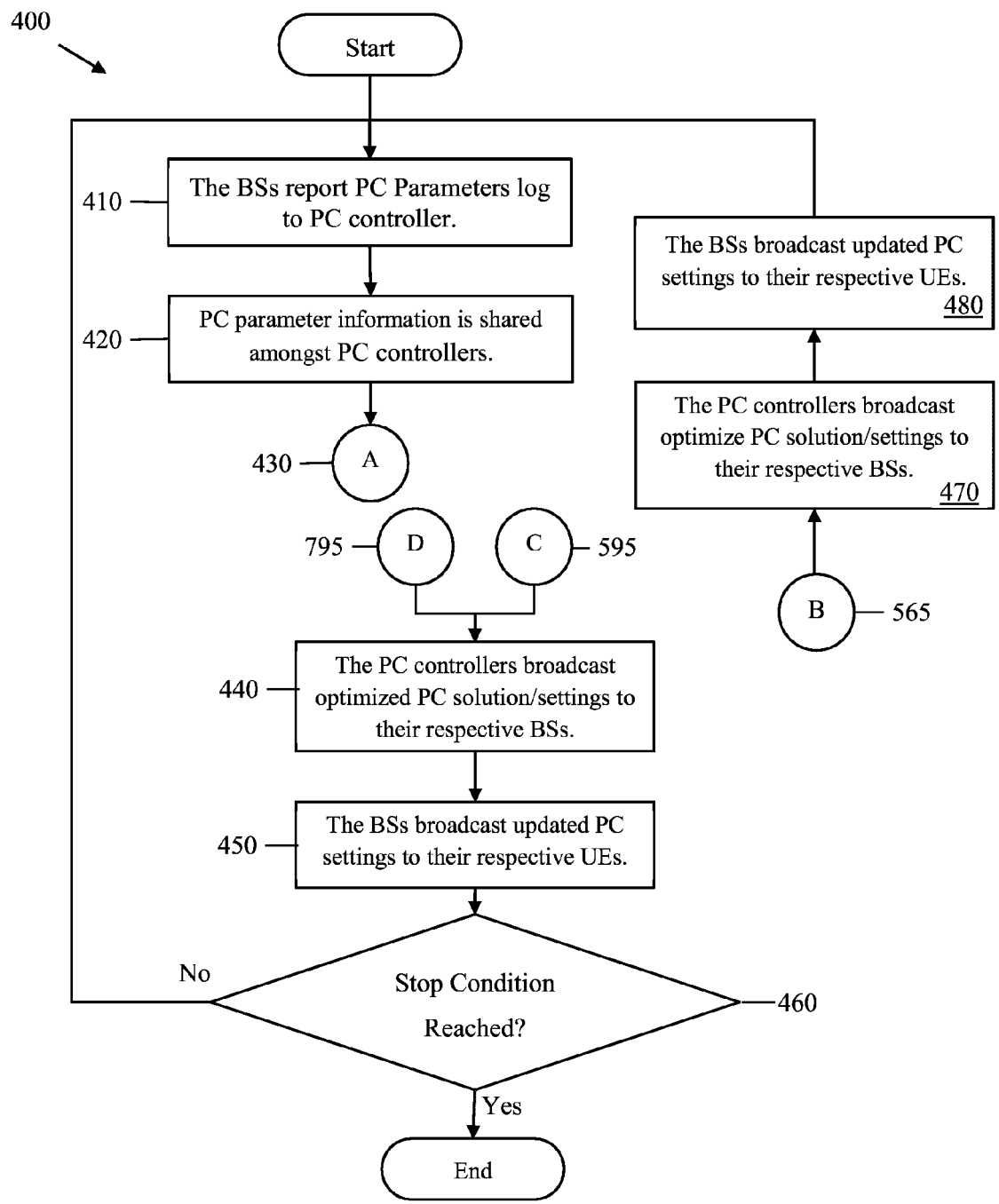
FIG. 4 illustrates a flowchart of an embodiment of a method for performing uplink PC optimization in a wireless communication network.

FIG. 4 illustrates a flowchart of a method 400 for performing uplink PC optimization in a wireless communication network. The method 400 may begin at step 410, where the BSs may report PC parameters to the PC controllers in the form of a log. The PC parameters may include current PC settings, as well as PC parameter statistics including path loss information, the top N interferes (where N is an integer greater than zero), measured IoTs, and other pertinent information. The PC parameters may allow the PC controller to determine a payoff (or aggregate benefit) of a computed PC solution, which may be defined as the difference between a revenue (e.g., gains in some BSs' performance) and a cost (e.g., loss in other BSs' performance) for a global PC solution. The method 400 may then proceed to step 420, where the PC controllers may distribute the PC parameters and/or other configuration information amongst themselves. By sharing of PC parameters and/or configuration data, the PC controllers may be able to achieve parallel optimization. However, in embodiments where communication between the neighboring PC controllers is infeasible or impractical, and the step 420 may be omitted entirely. In some embodiments, the PC controllers may exchange messages via external interfaces, or external interfaces may be used to monitor the PC communications.

Figure 5:
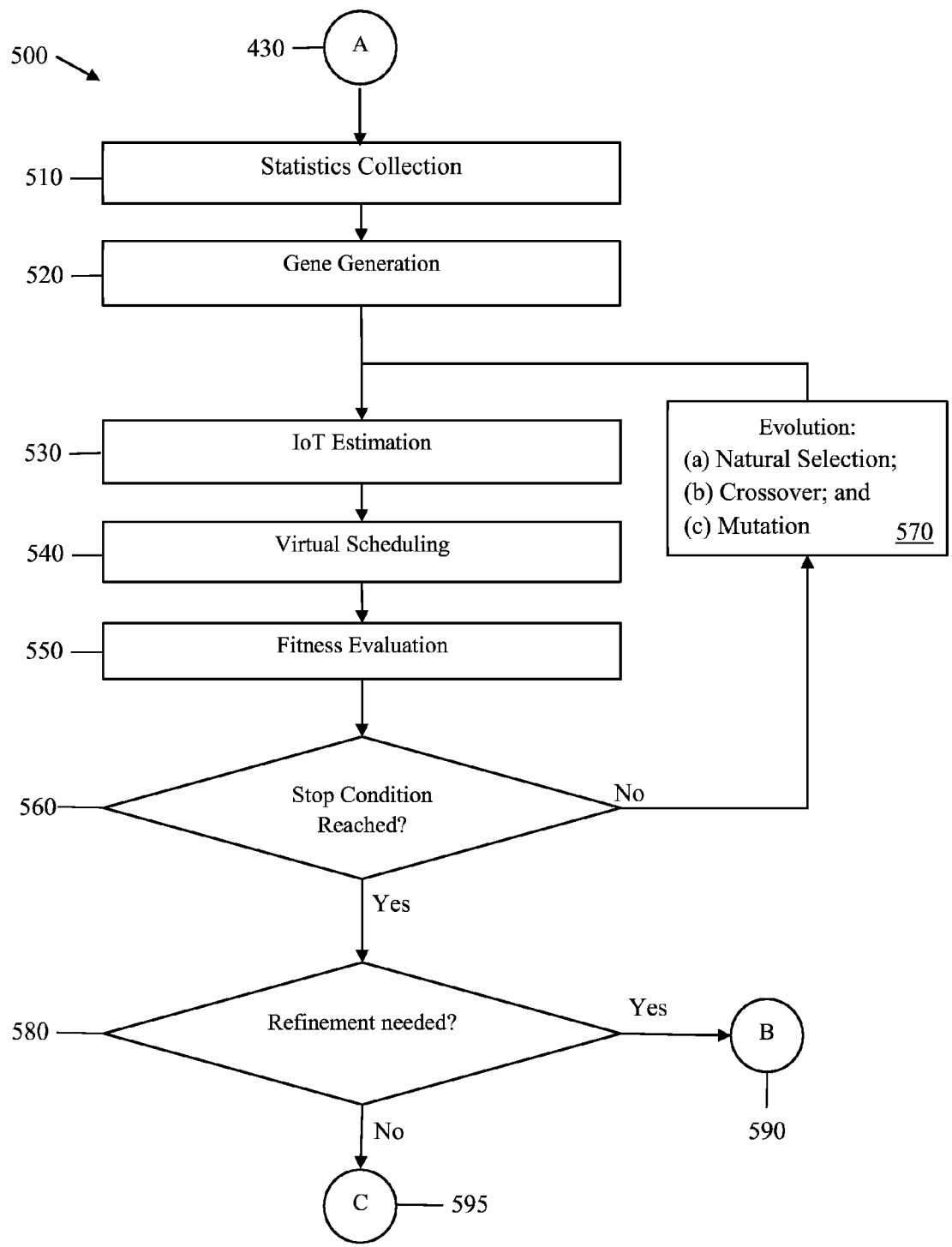
FIG. 5 illustrates a flowchart of an embodiment of a method for performing an uplink PC optimization algorithm.
Figure 7:
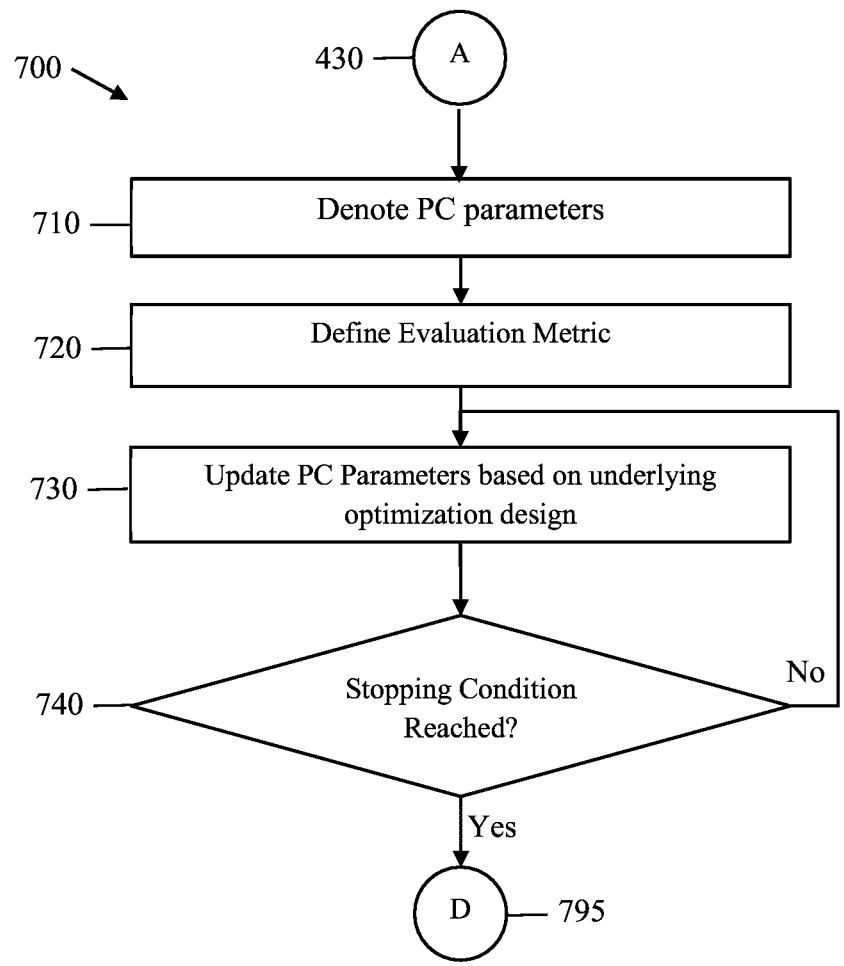
FIG. 7 illustrates a flowchart of another embodiment of a method for performing an uplink PC optimization algorithm.

Next, the method 400 may proceed to step A 430, where an uplink optimization algorithm may be performed by the PC controllers. In some embodiments, a non-generic uplink optimization algorithm (e.g., as illustrated in FIG. 5) may be performed to achieve a globally optimized PC solution. In other embodiments, a generic PC optimization algorithm (e.g., as illustrated in FIG. 7) may be performed to obtain a globally optimized PC solution.

FIG. 5 illustrates a method 500 for performing a PC optimization algorithm, which may come after step A 430. Although the method 500 may be described in the context of a fractional PC scheme, concepts applied during the method 500 may be equally applicable to other PC schemes (e.g., using other PC solution parameters). The method 500 may begin at step 510, where the PC processor may collect PC parameter statistics (e.g., IoT, PL, etc.) from the BSs. For instance, each BS may report their average IoT per resource block (RB) in the frequency domain, UE profiles, and the profiles of the strongest interferers. Subsequently, the method 500 may proceed to step 520, where the PC processor may generate a plurality of parent genes.

As used herein, the term "gene" may refer to an array or group of PC solutions corresponding to the group of BSs served by the PC processor, with each PC solution corresponding to a respective one of the BSs assigned to the PC processor. The term "parent gene" may refer to a gene that precedes a descendent gene, and the term "descendent gene" may refer to any gene that is produced from one or more parent genes via an evolutionary step, e.g., crossover, mutation, etc. In some embodiments, the original parent genes may comprise first generation PC solutions, while descendent genes may comprise evolved power control solutions. As used herein, an ancestor gene may be any gene that contributed to the evolution of a next generation gene, even if the ancestor gene is several evolutionary iterations removed from the next generation gene.

Each gene may comprise the same number of PC solutions as there are BSs in the cluster. For instance, if a PC controller is assigned twenty BSs, then each gene created in step 520 may include twenty PC solutions. In an embodiment, the PC controller may generate N parent genes (where N is an integer greater than zero), with each gene representing a feasible or possible global PC solution. In some embodiments, the PC settings of each parent gene may be identical upon initialization, such that an acceptable operating point is reached completely through crossover and mutation (discussed below). In other embodiments, at least some of the parent genes may have differing PC settings upon initialization. For instance, the PC settings for the various genes may be assigned randomly in order to achieve gene pool randomization, which may allow the algorithm to reach an acceptable global PC solution (e.g., an optimized global PC solution) using fewer evolutionary iterations.

Subsequently, the method 500 may proceed to step 530, where the PC processor may perform an IoT estimation for each of the genes generated by step 520. Specifically, during step 530, the PC controller may estimate an IoT of each RB for each BS based on the PC settings of each gene. Hence, an IoT spectrum may be generated for each gene. In some embodiments, other PC parameter statistics (e.g., path loss, etc.) may be estimated in addition to (or in place of) the IoT spectrum. In networks implementing a fractional PC scheme, there may be two PC solution parameters ($P_0$, $\alpha$) defined for each BS by each gene. As used herein, the term "PC solution parameters" may refer to any setting that may be manipulated during crossover and/or mutation to evolve the gene. In fractional PC systems, a $BS_m$ may compute the interference of an $UE_j$'s uplink channel (m and j are integers) based on real PC solution parameters ($P_j$, $\alpha_j$) of the $UE_j$ using the formula:

$$I_{j,m} = \left(\frac{p_j}{g_{j,s}^{\alpha_j}}\right) g_{j,m},$$

where $g_{j,m}$ is the channel gain (negative path loss) of $UE_j$ to the $BS_m$ and $g_{j,s}$ is the channel gain of the $UE_j$ to a serving BS ($BS_s$) and ($P_j$, $\alpha_j$) are the PC solution parameters of the $UE_j$. As such, the $BS_m$ may estimate the interference of a UEj based on the proposed power control parameters ($\tilde{P}_0$, $\tilde{\alpha}$) of a given gene using the formula:

$$\tilde{I}_{j,m} = \left(\frac{\tilde{p}_j}{g_{j,s}^{\tilde{\alpha}_j}}\right) g_{j,m}.$$

Consequently, the $IoT_m$ of each $BS_m$ can be estimated according to the formula:

$$\tilde{IoT}_m \approx IoT_{m,ref}\left(\frac{\sum_j \tilde{I}_{j,m} + \sigma^2}{\sum_j I_{j,m} + \sigma^2}\right),$$

where $\sigma^2$ is thermal noise power, $IoT_{m,ref}$ is the reference IoT of $BS_m$ obtained from the current power control settings in the real system, and $\tilde{IoT}_m$ is the IoT estimate of the $BS_m$ with ($\tilde{P}_0$, $\tilde{\alpha}$).

After estimating IoT, the method 500 may proceed to step 540, where the PC processor may perform virtual scheduling for each gene based on the IoTs estimated in step 530. The virtual scheduling may be similar to real scheduling in that virtual scheduling may be performed for each BS incrementally (i.e., on a per BS basis). However, unlike real scheduling, virtual scheduling may lack channel quality feedback, and, as a result, may be performed using fixed channel quality indicators (CQIs), e.g., performed under the assumption that the channels and IoTs are constant/static. Virtual scheduling may be performed for each gene a set number of times, with the average bit rate ($R_{avg}$) for each UE being updated after each round of virtual scheduling. Further, virtual scheduling may assume the instantaneous bit rate ($R_{ins}$) is constant (again, because of a lack channel quality feedback), and consequently virtual scheduling decisions may be made solely on the basis of $R_{avg}$. After all rounds of virtual scheduling have been completed, the PC controller may estimate one or more performance metrics (e.g., user/cell throughput, etc.) for each gene.

Subsequently, the method 500 may proceed to step 550, where the PC processor may perform a fitness evaluation of each gene, with genes having higher fitness values being more likely to be chosen during natural selection in step 570. Fitness values may be assigned based on one or a combination of various fitness metrics. For instance, a fitness value may be assigned based on the linear combination of coverage and sum throughput as given by the following equation: $Fitness_g = \omega f_1(\vec{T}_g) + (1-\omega) f_2(\vec{T}_g)$, where $\vec{T}_g$ is a set of user throughputs given gene g, $f_1(\vec{T}_g)$ is the normalized sum throughput performance, $f_2(\vec{T}_g)$ represents the throughput performance (e.g., five percentile throughput performance), and ω is a tunable weighting factor. The fitness evaluation can be extended to include different performance metrics such as maximum throughput, minimum throughput, sum log throughout, fairness measure, energy consumption, as well as others familiar to those of ordinary skill in the art.

Subsequently, the method 500 may proceed to step 560, where the PC processor may determine whether a stop condition has been reached. The stop condition may be a specified number of rounds of evolution, as the resulting PC solution will become further optimized with each successive round of evolution. If a stop condition has not be reached (as is likely the case during the first iteration), then the method 500 may proceed to step 570, where the PC processor may perform evolution to improve the genes. Evolution may comprise three evolutionary steps: (a) natural selection; (b) crossover; and (c) mutation. Natural selection may be the process of selecting a set of selected parent genes from the original parent gene in a probalistic fashion based on their fitness value. In an embodiment, the set of selected parent genes may comprise a gene pool of size S (S is an integer), while the set of original parent genes may comprise a gene pool of size N. In some embodiments, N may be greater than S such that the size of the gene pool decreases with each evolutionary iteration. In other embodiments, S may be equal to or greater than N such that the size of the gene pool stays the same or increases with each evolutionary iteration. Natural selection may be better understood when referencing FIG. 6.

Figure 6:
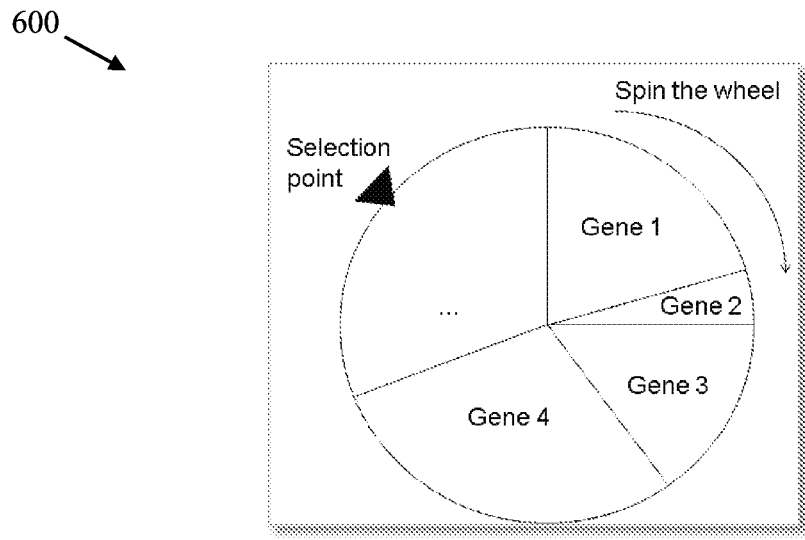
FIG. 6 illustrates an embodiment of a probability wheel for performing natural selection.

Specifically, FIG. 6 illustrates a probability wheel 600 comprising a plurality of genes. Genes having higher fitness values receive higher assigned probabilities (i.e., more real-estate on the probability wheel 600), and are therefore more likely to be chosen for the S gene pool. One objective of natural selection may be to retain strong genes while allowing poor genes to evolve, as poor genes may potentially become better candidates after the crossover and mutation steps. Allowing the poorer genes to evolve may be important in that it prevents locally optimal PC solutions from being trapped (or locked) during optimization. Subsequent to selecting two genes during natural selection, one or more new offspring genes may be generated by performing a crossover operation on the two selected genes. The crossover operation may generate a first offspring gene by combining the $P_o$ of a first selected gene with the a of a second selected gene, and a second offspring gene by combining the a of the first selected gene with the $P_o$ of the second selected gene. After crossover, the PC controller may perform mutation on the offspring gene to generate a mutated gene. The mutation operation may perturb/change the PC solution parameters ($P_o$, α) of the offspring gene to produce the mutated gene. Hence, the mutated gene may contain slightly altered $P_o$ and/or α values, and therefore the fitness of the mutated gene may differ somewhat from the fitness of offspring gene. Once a stop condition has been reached, the method 500 may proceed to step 580, where the PC controller may determine whether further refinement is needed. If further refinement is needed, the method 500 may terminate at step B 590 (discussed below). If no refinement is needed, the method 500 may terminate at step C 595 (also discussed below).

Assuming no further refinement is needed, the method 400 (referring again to FIG. 4) may proceed to step 440, where the PC controllers may broadcast the optimized global PC solution to the respective BSs to which they have been assigned. These messages may be observable by external interfaces. Next, the method 400 may proceed to step 450, where the BSs may broadcast the updated PC settings to the UEs. At step 460, the method 400 may determine whether a stop condition has been reached. The stop condition may be a specified number of rounds of the method 400, e.g., with a counter being incremented each time the method 400 reaches the step 460.

Assuming further refinement is needed, the method 400 (referring again to FIG. 4) may proceed to step 470, where the PC controllers may broadcast the optimized PC solutions and/or PC settings to their respective BSs (i.e., the BSs to which they have been assigned or which are located in their assigned proximity region). These messages may be observable by external interfaces. Next, the method 400 may proceed to step 480, where the BSs may broadcast the updated PC settings to the UEs. Subsequently, the method 400 may proceed to step 410, where the steps 410-430 and the method 500 may be repeated until further refinement is no longer necessary.

Refinement may be necessary when evolutionary progression is ineffective in generating an optimized global PC solution. Specifically, the effectiveness of evolutionary progression in reaching an optimized global PC solution may ultimately be limited by the accuracy of the IoT estimations performed in step 530. For instance, less accurate IoT estimations may produce inferior global PC solutions irrespective of the number of evolutionary iterations. As such, re-performing IoT estimation based on a new set of reference IoTs (i.e., reference IoTs obtained subsequent PC parameters obtained after implementing the evolved gene) may produce a higher level of optimization than simply repeating the evolutionary progression using the same (potentially inaccurate) IoT estimations.

FIG. 7 illustrates an embodiment of a method 700 for performing a PC optimization algorithm, which may be an alternative to the method 500 discussed above. The method 700 may begin at step 710, where the PC solution parameters of the BSs may be denoted. Specifically, a first PC solution parameter ($p_i$) may be denoted as the PC solution parameter of a BSi, and a grouping of second PC parameters ($p_{-i}$) may be denoted for the other BSs (i.e., BSs other than BSi), where $p_{-i}=\{p_0, \ldots, p_{i-1}, p_{i+1}, \ldots, p_m\}$. Further, a vector ($\vec{p}$) of PC parameters for all the BSs may be denoted, where $\vec{p}=[p_i, p_{-i}]$. Additionally, the utility the BSi may be denoted as $U_i(p_i, p_{-i})$. Next, the method 700 may proceed to step 720, where a metric may be defined to evaluate the performance of the BSs in a cluster at a time (t). Specifically, the metric may be a function of all the utilities $f(U_1(\vec{p}), \ldots, U_n(\vec{p}))|t$. Next, the method 700 may proceed to step 730, where the $\vec{p}$ may be updated according to an underlying PC optimization design. For instance, $\vec{p}$ may be updated based on a faction that considers all of the various utilities over a time spectrum, e.g., $(U_1(\vec{p}), \ldots, U_n(\vec{p}))|t+1>f(U_1(\vec{p}), \ldots, U_n(\vec{p}))|t$. Next, the method 700 may proceed to step 740, where the PC controller may determine whether a stop condition has been reached. The stop condition may be a certain number of iterations of the step 730, or some other metric related to the quality of the computed PC optimization algorithm. If a stop condition has not been reached, the method 700 may revert back to the step 730, where the PC parameters may be re-updated. If a stop condition has been reached, the method 740 may terminate at step D 795.

After performing the optimization algorithm, the method 400 may proceed to the step 440, where the PC controllers may broadcast the optimized PC solutions (i.e., the PC settings) to their respective BSs (i.e., the BSs to which they have been assigned or which are located in their assigned proximity region). These messages may be observable by external interfaces. Next, the method 400 may proceed to step 450, where the BSs may broadcast the updated PC settings to the UEs. At step 460, the method 400 may determine whether a stop condition has been reached. The stop condition may be a certain number of iterations of the steps 410-450, or some metric related to the quality of a global PC solution's performance. If a stop condition has not been reached, the method 400 may revert back to step 410, where the steps 410-450 (and if necessary, other intervening steps) may be repeated until a stop condition is reached. Once a stop condition is reached, the method 400 may end.

Figure 8:
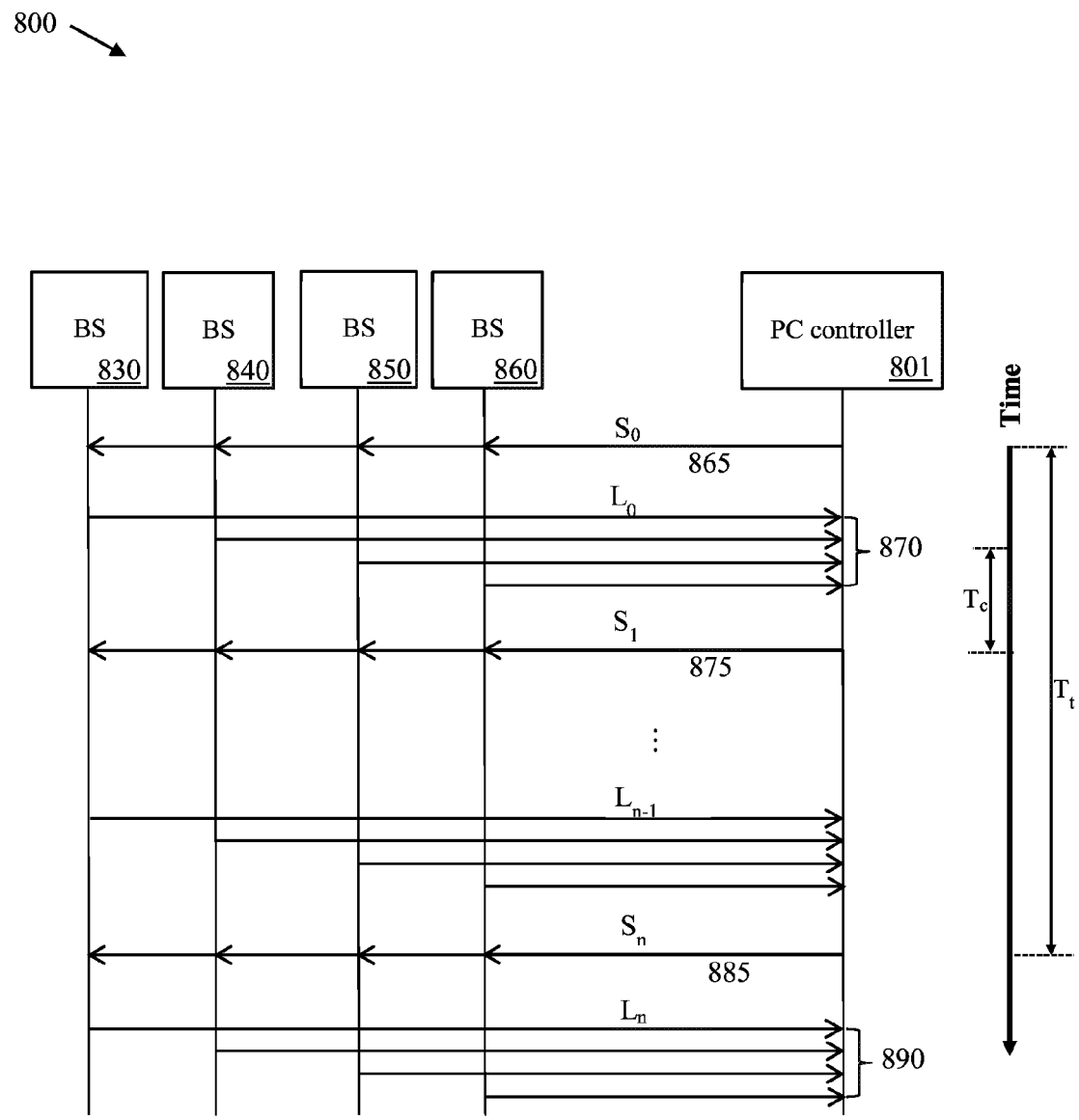
FIG. 8 illustrates a diagram of another embodiment of a communication protocol for implementing uplink PC optimization in a wireless communication network.

FIG. 8 illustrates a diagram of a protocol Boo for implementing uplink optimization. The protocol 800 may take place between a PC controller 801 and a plurality of BSs 830-860, and may comprise exchanging a plurality of PC settings (e.g., $S_o$, $S_1$, ... $S_n$) and a plurality of PC statistic logs ($L_o$, $L_1$, ... $L_n$). The protocol 800 may occur over a time spectrum (Ti), during which a PC optimization algorithm may be generated. The protocol 800 may begin with a broadcast message 865 sent from the PC controller 801 to the BSs 830-860, which may carry an initial set of PC settings ($S_o$). Upon receiving the broadcast message 865, the BSs 830-860 may implement the initial PC settings, and generate a set of PC parameter statistics based on those initial PC settings. The BSs may then summarize or aggregate the generated PC parameter statistics into PC parameter logs ($L_o$), which may be forwarded to the PC controller 801 via the messages 870. Upon receiving the messages 870, the PC controller 801 may compute an optimization algorithm to generate a first set of optimized PC settings ($S_1$). The time required to compute the optimization algorithm ($T_c$) may vary depending on a variety of factors, including the type of optimization algorithm used, as well as the computation settings of the optimization algorithm (e.g., stop conditions, etc.). Upon computing the first set of optimized PC settings, the PC controller 801 may send those settings to the BSs 830-860 via the broadcast message 875. The PC controller 801 and the BSs 830-860 may continue to exchange parameter settings ($S_2$ through $S_{n-1}$) and parameter statistic logs ($L_1$ through $L_{n-1}$) until an optimized global PC solution is reached. Upon calculating an optimized global PC solution, the PC controller 801 may send the PC settings (Se) corresponding to that solution to the BSs 830-860 via the broadcast message 885. In some embodiments, the BSs 830-860 may return a PC parameter log (La) to the PC controller 801 via the messages 890, which may correspond to PC parameters generated as a result of implementing the optimized global PC solution in the wireless network. In other embodiments, the protocol 800 may not include the messages 890.

Figure 9:
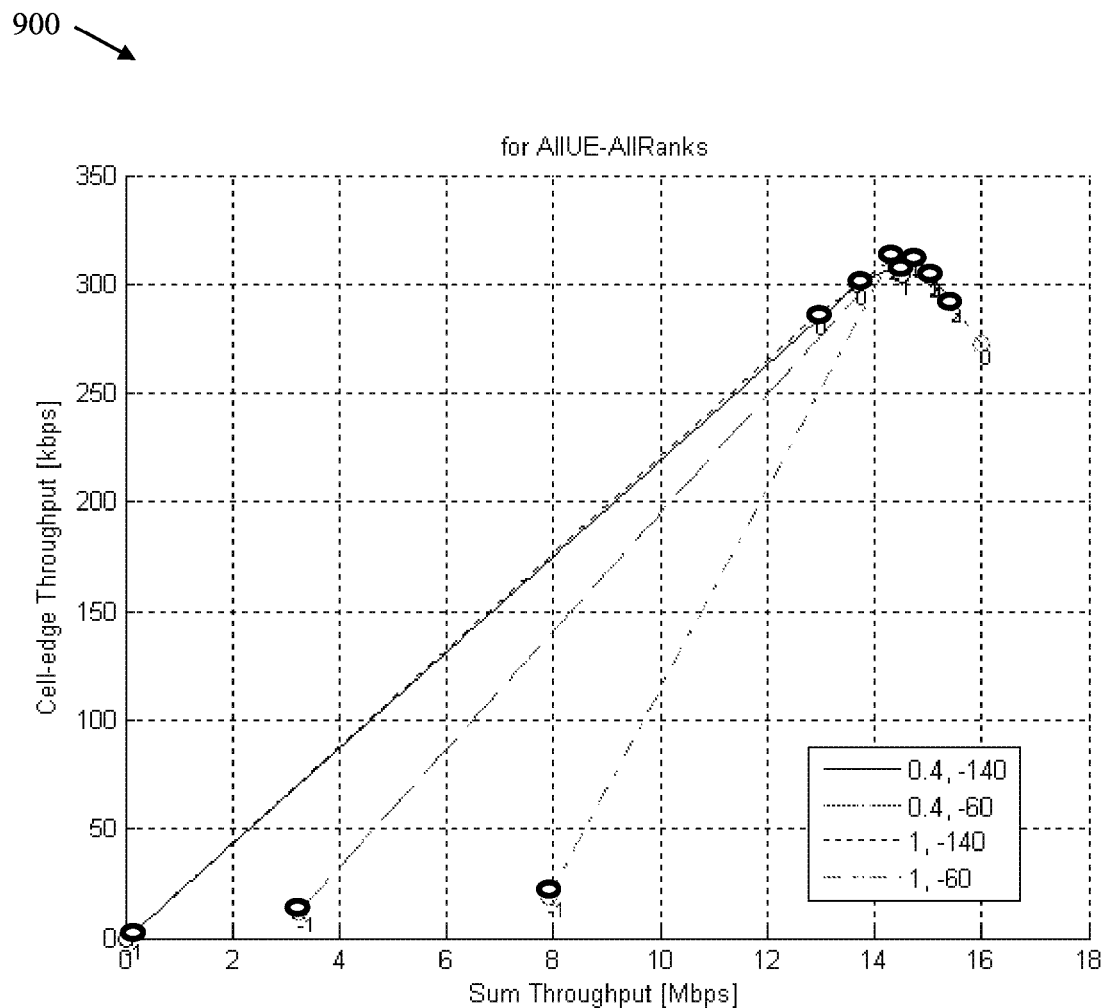
FIG. 9 illustrates an example of simulation results obtained using an embodiment of uplink PC optimization in a wireless communication network.
Figure 10:
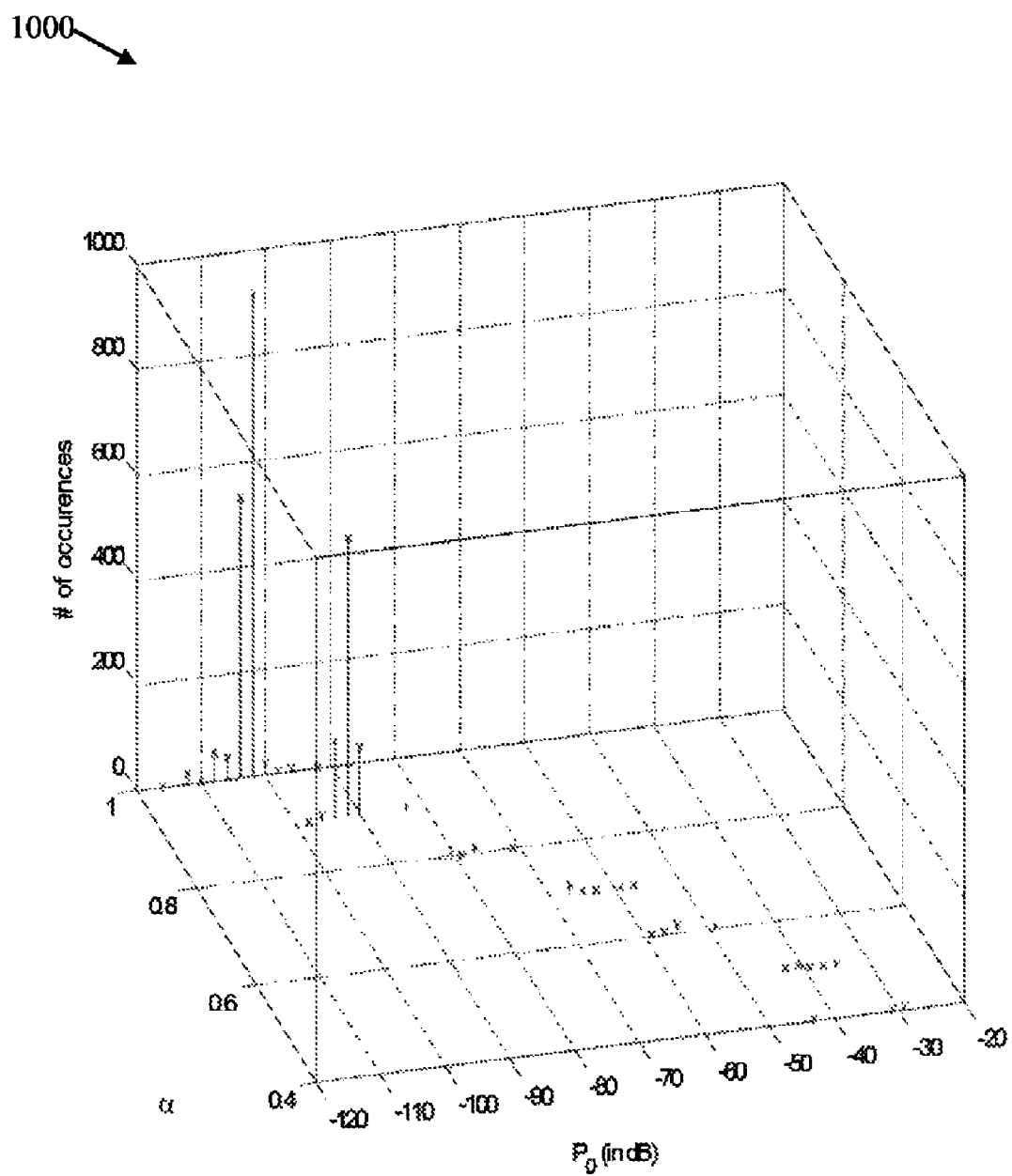
FIG. 10 illustrates another example of simulation results obtained using an embodiment of uplink PC optimization in a wireless communication network.
Figure 11:
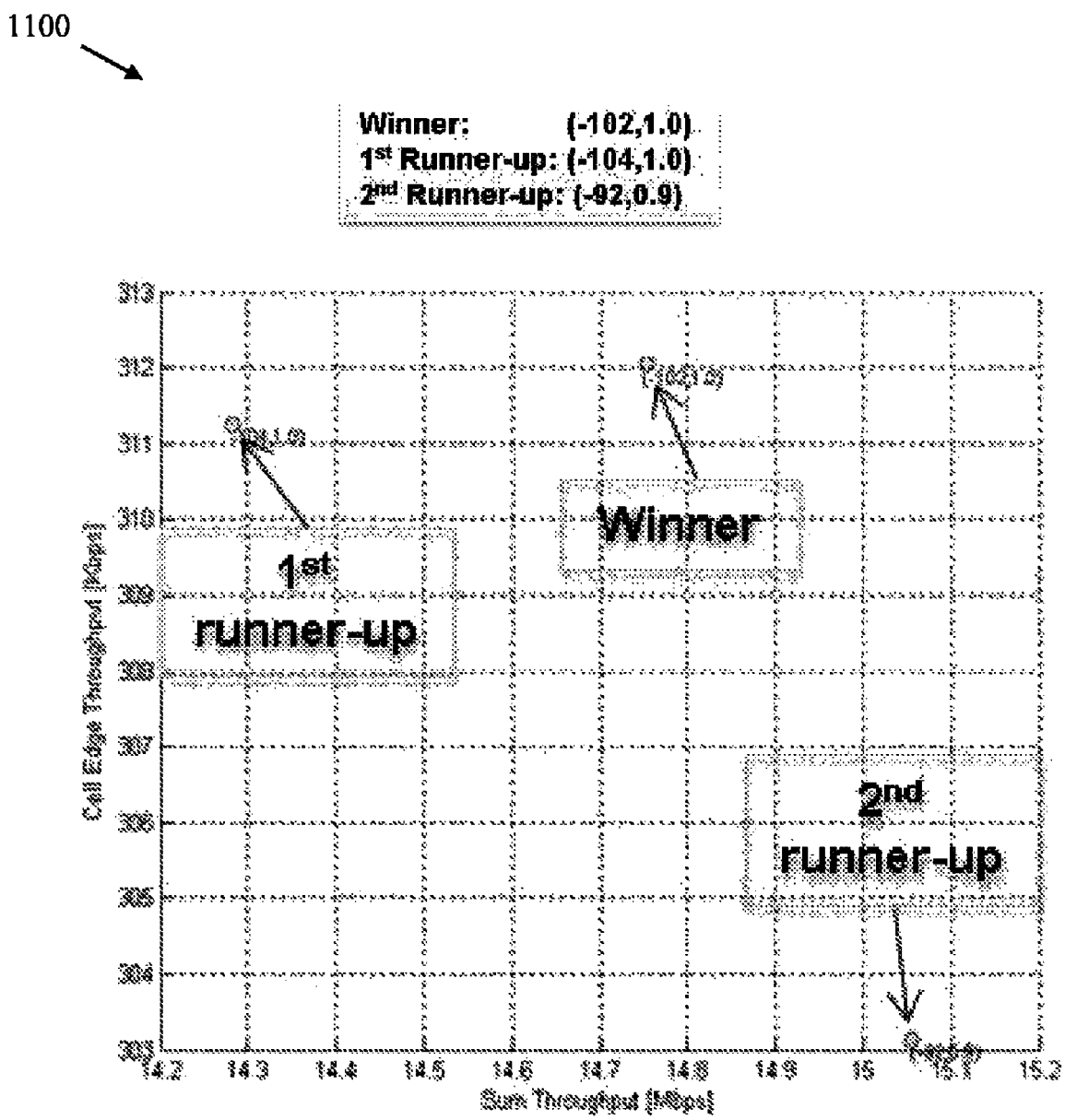
FIG. 11 illustrates another example of simulation results obtained using an embodiment of uplink PC optimization in a wireless communication network.

FIGS. 9-11 illustrate simulation results obtained using an embodiment of the uplink optimization method discussed above. The simulation was performed under the following assumptions: Objective function was to optimize linear combination of normalized sum throughput and normalized coverage (30% on normalized sum throughput+70% on normalized coverage); Decision variables were fractional power control parameters $P_o$ and $\alpha$; there were twenty-five UEs per coverage area (cell) and fifty seven cells; and inter-site distance (ISD) was 500 meters.

FIG. 9 shows a graph 900 showing the sum throughput of a cellular network (i.e., the overall throughput) with the cell-edge throughput (i.e., the throughput of UEs on the "edge" of a BS's coverage area) in relation to iterations of the optimization algorithm. Cell-edge throughput and overall throughput may be important metrics for evaluating a global PC solution in a wireless network. Customers in networks with low overall throughput may observe slow connection speeds, while customers in networks with low cell-edge throughput may, for instance, observe higher instances of dropped calls as they migrate from one coverage area to another. Each of the plot lines in the graph 900 represent a different initial set of PC solution parameters ($\alpha$, $P_o$) as shown in the key on the bottom right, with each of the markers (denoted by the circles) indicating an iteration of PC optimization. As shown, the global PC solutions converge to a region of desirable operating points after one or two rounds of PC optimization (irrespective of how aggressive or conservative the initial PC solution parameter settings), which suggests that some embodiments of the uplink optimization method disclosed herein will perform reliably over a wide range of PC solution parameter settings. Notably, the range of desirable PC solution parameter settings may change if the utility function for fitness evaluation or a weighting factor is changed, which may be done at the discretion of a system designer.

FIG. 10 illustrates a histogram 1000 of PC solution parameter settings chosen by the proposed algorithm considering all the different initial PC settings. The height of each bar may correspond to the number of times a PC setting is chosen by the proposed PC optimization algorithm. FIG. 11 illustrates the corresponding system performances of the winner, the first runner up, and the second runner up for an objective function placing seventy percent emphasis on coverage, and a thirty percent emphasis on throughput. The winner had PC solution parameter ($\alpha$, $P_o$) of (−102, 1.0), the first runner up had PC parameter settings ($\alpha$, $P_o$) of (−104, 1.0), and the second runner-up had PC parameter settings ($\alpha$, $P_o$) of (−92, 0.9). FIG. 11. Illustrates a graph 1100 of the corresponding performances of the winner, the first runner up, and the second runner up. These results were verified by an exhaustive search.

In wireless networks, network operators may often trade coverage for overall throughput. Specifically, UEs positioned on the "edge" of a BS's coverage area may produce high levels of interference in neighboring coverage areas due to their proximity to those neighboring coverage areas as well as their need to transmit uplink signals at a higher power level. As such, lowering the uplink power of cell-edge UEs may decrease network interference, thereby increasing overall network throughput. However, providing acceptable coverage to cell-edge UEs may be an important consideration as well, and consequently most networks must balance overall throughput and cell-edge throughput to meet the needs of their customers. Accordingly, embodiments of the disclosed PC optimization method may allow an operator to specify the balance by adjusting the settings of the optimization algorithm's objective function. For instance, the simulation results were generated using an embodiment that specified an objective function placing a seventy percent emphasis on coverage, and a thirty percent emphasis on throughput. However, other embodiments may place a different emphasis on coverage and throughput, e.g., a ninety percent emphasis on coverage and a ten percent emphasis on throughput.

Figure 12:
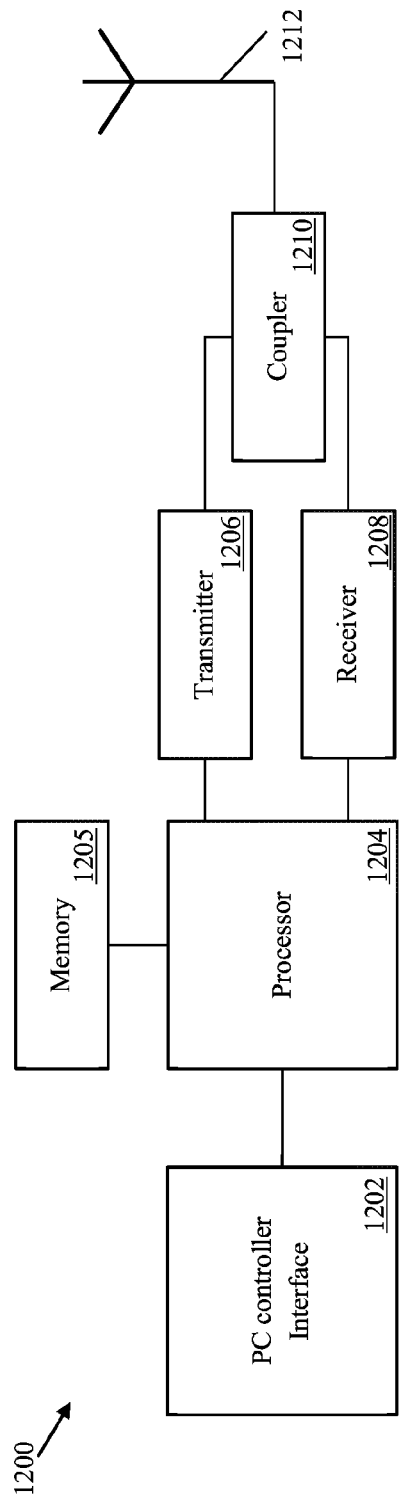
FIG. 12 illustrates a block diagram of an embodiment base station.

FIG. 12 illustrates a block diagram of an embodiment base station 1200. The base station 1200 may include a PC controller interface 1202, a processor 1204, a memory 1205, a transmitter 1206, a receiver 1208, a coupler 1210, and an antenna 1212, which may be arranged as shown in FIG. 12. The PC controller interface 1202 may be any component or collection of components that allows the BS 1200 to engage in network communications with a PC controller. The processor 1204 may be any component capable of performing computations and/or other processing related tasks, and the memory 1205 may be any component capable of storing programming and/or instructions for the processor. The transmitter 1206 may be any component capable of transmitting a signal, while the receiver 1208 may be any component capable of receiving a signal. The coupler 1210 may be any component capable of isolating a transmission signal from a reception signal, such as a duplexer. The antenna 1212 may be any component capable of emitting and/or receiving a wireless signal. In an embodiment, the BS 1200 may be configured to operate in an LTE network using an OFDMA downlink channel divided into multiple sub-bands or subcarriers and using SC-FDMA in the uplink. In alternative embodiments, other systems, network types and transmission schemes can be used, for example, 1×EV-DO, IEEE 802.11, IEEE 802.15 and IEEE 802.16, etc.

Figure 13:
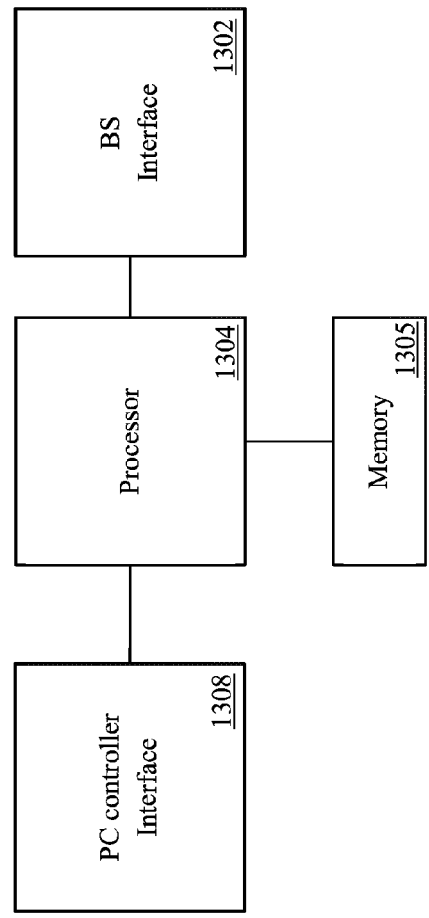
FIG. 13 illustrates a block diagram of an embodiment PC controller.

FIG. 13 illustrates a block diagram of an embodiment PC controller 1300. The PC controller 1300 may include a BS interface 1302, a processor 1304, a memory 1305, and a PC controller interface 1308, which may be arranged as shown in FIG. 13. The BS interface 1302 may be any component or collection of components that allows the PC controller 1300 to engage in network communications with a BS. The processor 1304 may be any component capable of performing computations and/or other processing related tasks, and the memory 1305 may be any component capable of storing programming and/or instructions for the processor. The PC controller interface 1308 may be any component or collection of components that allows the PC controller 1300 to engage in network communications with other PC controllers.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
receiving a set of power control parameters from a set of base stations in a wireless network;
probabilistically determining an optimized global power control solution for the wireless network, wherein the optimized global power control solution comprises a set of local power control solutions that are computed by iteratively performing a power control optimization algorithm based at least in part on the set of power control parameters, and wherein the optimized global power control solution is determined without performing a search of substantially all possible power control solutions for the wireless network; and
sending the optimized global power control solution to the set of base stations in the wireless network.

2. The method of claim 1, wherein probabilistically determining the optimized power control solution comprises:
generating a set of parent genes each of which comprises a set of first generation power control solutions for the set of base stations;
evolving the set of parent genes through natural selection, crossover, mutation, or combinations thereof to produce a set of descendent genes, wherein each descendent gene comprises a set of evolved power control solutions for the set of base stations;
evaluating a fitness of each descendent gene; and
selecting one of the descendent genes in accordance with the fitness evaluation, wherein the set of evolved power control solutions for the selected descendent genes is determined to be the optimized global power control solution.

3. The method of claim 2, wherein evaluating the fitness of each descendent gene comprises assigning each gene a fitness value based on a projected suitability of the descendent gene as a global power control solution for the wireless network.

4. The method of claim 2, wherein evaluating the fitness of each descendent gene comprises:
generating a set of estimated interference over thermal values (IoTs) for each descendent gene; and
evaluating the fitness of each descendent gene in accordance with the corresponding set of IoTs.

5. The method of claim 4, wherein each set of IoTs includes an estimated IoT for a first generation power control solution for each of the respective descendent genes, and wherein each estimated IoT indicates an estimated amount of interference realized by a corresponding base station in instances where the corresponding descendent gene was implemented as a global power control solution in the wireless network.

6. The method of claim 2, wherein generating the set of parent genes comprises randomly assigning power control settings to each of the first generation power control solutions to achieve gene pool randomization.

7. The method of claim 1, further comprising:
denoting a plurality of power control solution parameters;
defining an evaluation metric; and
updating power control parameters based on an underlying optimization design.

8. The method of claim 7, further comprising: repetitiously performing the denoting, defining, and updating instructions until a stop condition is reached.

9. An apparatus comprising:
a processor; and
a computer readable storage medium storing programming for execution by the processor, the programming including instructions to:
receive a set of power control parameters from a set of base stations in a wireless network;
probabilistically determine an optimized global power control solution for the wireless network, wherein the optimized global power control solution comprises a set of local power control solutions that are computed by iteratively performing a power control optimization algorithm based at least in part on the set of power control parameters, and wherein the optimized global power control solution is determined without performing a search of substantially all possible power control solutions for the wireless network; and
send the optimized global power control solution to the set of base stations in the wireless network.

10. The apparatus of claim 9, wherein the instructions to probabilistically determine the optimized power control solution include instructions to:
generate a set of parent genes each of which comprises a set of first generation power control solutions for the set of base stations;
evolve the set of parent genes through natural selection, crossover, mutation, or combinations thereof to produce a set of descendent genes, wherein each descendent gene comprises a set of evolved power control solutions for the set of base stations;
evaluate a fitness of each descendent gene; and
select one of the descendent genes in accordance with the fitness evaluation, wherein the set of evolved power control solutions for the selected descendent genes is determined to be the optimized global power control solution.

11. The apparatus of claim 10, wherein the instructions to evaluate the fitness of each descendent gene include instructions to assign each gene a fitness value based on a projected suitability of the descendent gene as a global power control solution for the wireless network.

12. The apparatus of claim 10, wherein the instructions to evaluate the fitness of each descendent gene include instructions to:
generate a set of estimated interference over thermal values (IoTs) for each descendent gene; and
evaluate the fitness of each descendent gene in accordance with the corresponding set of IoTs.

13. The apparatus of claim 12, wherein each set of IoTs includes an estimated IoT for a first generation power control solution for each of the respective descendent genes, and wherein each estimated IoT indicates an estimated amount of interference realized by a corresponding base station in instances where the corresponding descendent gene was implemented as a global power control solution in the wireless network.

14. The apparatus of claim 10, wherein the instructions to generate the set of parent genes include instructions to randomly assign power control settings to each of the first generation power control solutions to achieve gene pool randomization.

15. A computer program product comprising a non-transitory computer readable storage medium storing programming, the programming including instructions to:
- receive a set of power control parameters from a set of base stations in a wireless network;
- probabilistically determine an optimized global power control solution for the wireless network, wherein the optimized global power control solution comprises a set of local power control solutions that are computed by iteratively performing a power control optimization algorithm based at least in part on the set of power control parameters, and wherein the optimized global power control solution is determined without performing a search of substantially all possible power control solutions for the wireless network; and
- send the optimized global power control solution to the set of base stations in the wireless network.

16. The computer program product of claim 15, wherein the instructions to probabilistically determine the optimized power control solution include instructions to:
- generate a set of parent genes each of which comprises a set of first generation power control solutions for the set of base stations;
- evolve the set of parent genes through natural selection, crossover, mutation, or combinations thereof to produce a set of descendent genes, wherein each descendent gene comprises a set of evolved power control solutions for the set of base stations;
- evaluate a fitness of each descendent gene; and
- select one of the descendent genes in accordance with the fitness evaluation, wherein the set of evolved power control solutions for the selected descendent genes is determined to be the optimized global power control solution.

17. The computer program product of claim 16, wherein the instructions to evaluate the fitness of each descendent gene include instructions to assign each gene a fitness value based on a projected suitability of the descendent gene as a global power control solution for the wireless network.

18. The computer program product of claim 16, wherein the instructions to evaluate the fitness of each descendent gene include instructions to:
- generate a set of estimated interference over thermal values (IoTs) for each descendent gene; and
- evaluate the fitness of each descendent gene in accordance with the corresponding set of IoTs.

19. The computer program product of claim 18, wherein each set of IoTs includes an estimated IoT for a first generation power control solution for each of the respective descendent genes, and wherein each estimated IoT indicates an estimated amount of interference realized by a corresponding base station in instances where the corresponding descendent gene was implemented as a global power control solution in the wireless network.

20. The computer program product of claim 16, wherein the instructions to generate the set of parent genes include instructions to randomly assign power control settings to each of the first generation power control solutions to achieve gene pool randomization.

* * * * *